United States Patent [19]
Funkenbusch

[11] Patent Number: 5,098,541
[45] Date of Patent: Mar. 24, 1992

[54] METHOD OF MAKING MAGNETO OPTIC RECORDING MEDIUM WITH SILICON CARBIDE DIELECTRIC

[75] Inventor: Arnold W. Funkenbusch, White Bear Lake, Minn.

[73] Assignee: Minnesota Mining and Manufacturing Company, St. Paul, Minn.

[21] Appl. No.: 356,532

[22] Filed: May 25, 1989

Related U.S. Application Data

[62] Division of Ser. No. 150,921, Feb. 1, 1988, Pat. No. 4,917,970.

[51] Int. Cl.$^5$ ............................................. C23C 14/38
[52] U.S. Cl. ........................... 204/192.15; 204/192.16; 204/192.22
[58] Field of Search ....................... 204/192.15, 192.16, 204/192.22, 192.23, 192.26

[56] References Cited

U.S. PATENT DOCUMENTS

| | | | |
|---|---|---|---|
| 3,594,064 | 7/1971 | Bierlein | 350/151 |
| 4,414,650 | 11/1983 | Ohta et al. | 365/122 |
| 4,569,881 | 2/1986 | Freese et al. | 428/213 |
| 4,615,944 | 10/1986 | Gardner | 428/332 |
| 4,661,420 | 4/1987 | Nakamura et al. | 428/692 |
| 4,670,316 | 6/1987 | Kryder | 428/64 |
| 4,777,068 | 10/1988 | Omata et al. | 428/69 |

FOREIGN PATENT DOCUMENTS

| | | | |
|---|---|---|---|
| 0168046 | 1/1986 | European Pat. Off. | |
| 2919191 | 11/1979 | Fed. Rep. of Germany | 204/192.16 |
| 131835 | 12/1987 | Japan | |

OTHER PUBLICATIONS

Mogab, C. et al., "Preparation and Properties of Non-crystalline Silocone Carbide Films", *Journal of Applied Physics*, vol. 39, No. 8, pp. 3640–3645 (Jul. 1968).

Matsunami, H. et al., "Structures and Physical Properties of Sputtered Amorphous SiC Films", *Journal of Electronic Materials*, vol. 8, No. 3, pp. 249–260 (1979).

Tonda, T. et al., "Effects of Target Materials on the Structural Properties of Sputtered SiC Films", *Journal of Electrochemical Society: Electrochemical Science and Technology*, vol. 127, No. 1, pp. 44–47 (Jan. 1980).

Nagai, T. et al., "Effects of Nitrogen on the Electrical Properties of Sputtered Sic Films", *Thin Solid Films*, vol. 106, pp. 303–309 (1983).

Arimune, H. et al., "Environmental Stability of the Magneto-Optic Medium", *IEEE Translation Journal on Magnetics in Japan*, vol. TJMJ-1, No. 3, pp. 337 and 338 (Jun. 1985).

Nakamura, K. et al., "Enhancement of Kerr Rotation with Amorphous Si Film", *IEEE Transactions on Magnetics*, vol. MAG-21, No. 5, pp. 1654–1656 (Sep. 1985).

Product Data Sheet entitled "Physical Properties of Hexology SiC", from Sohio Engineered Materials Company, Structural Ceramics Division, Niagara Falls, N.Y., Copyright 1986.

R. Allen and G. A. N. Connell, "Magneto-Optic Properties of Amorphous Terbium-Iron", *Journal of Applied Physics*, vol. 53, No. 3, pp. 2353–2355, Mar. 1982.

Imamura, N., "The Development of Magneto-Optical Disk Memory with Semiconductor Lasers", presented at the Topical Meeting on Optical Data Storage, Jan. 17–20, 1983, INcline Village, Nev., pp. THA1-1--THA1-4.

M. Mansuripur and G. A. N. Connell, "Thermal Aspects of Magneto-Optical Recording", *Journal of Applied Physics*, vol. 54, No. 9, pp. 4794–4798, (Sep. 1983).

Imamura, N. et al., "Magneto-Optical Recording on Amorphous Films", *IEEE Transactions on Magnetics*, vol. MAG-21, No. 5, pp. 1607–1612 (Sep. 1985).

*Primary Examiner*—Nam X. Nguyen
*Attorney, Agent, or Firm*—Donald M. Sell; Walter N. Kirn; Peter Forrest

[57] ABSTRACT

A magneto optic recording medium comprising a substrate, an amorphous magnetizable rare earth-transition metal alloy layer, a transparent dielectric layer on at least one side of the magnetizable layer, and a reflective surface located to reflect light through the magnetizable alloy layer. The dielectric layer is comprised of silicon carbide of the formula $SiC_x$, wherein x, the molar ratio of carbon to silicon, is greater than 1. The dielectric layer is preferably deposited by direct current magnetron sputtering at low argon partial pressure from an electrically conductive mixture of silicon carbide and carbon. The medium exhibits similar or improved characteristics over media constructed with present dielectrics, for example, silicon suboxide ($SiO_y$, $y<2$).

7 Claims, 2 Drawing Sheets

METHOD OF MAKING MAGNETO OPTIC RECORDING MEDIUM WITH SILICON CARBIDE DIELECTRIC

CROSS-REFERENCE TO RELATED APPLICATION

This is a division of application Ser. No. 07/150,921, filed Feb. 1, 1988, now U.S. Pat. No. 4,917,970.

TECHNICAL FIELD

This invention relates to magneto optic recording media which employ dielectric materials to protect a rare earth-transition metal recording material from oxidation or corrosion, enhance signal to noise ratio, act as a thermal barrier, or for other purposes. The dielectric material is comprised of carbon-rich silicon carbide with properties desirable in this application, such as suitable index of refraction, transparency, and ability to prevent corrosion.

BACKGROUND

Magneto optic recording media are also known by several other names: thermomagnetic media, beam addressable files, and photo-magnetic memories. All of these terms apply to a storage medium or memory element which responds to radiant energy permitting the use of such energy sources as laser beams for both recording and interrogation. Such media modify the character of an incident polarized light beam so that the modification can be detected by an electronic device such as a photodiode.

This modification is usually a manifestation of either the Faraday effect or the Kerr effect on polarized light. The Faraday effect is the rotation of the polarization plane of polarized light which passes through certain magnetized media. The Kerr effect is the rotation of the plane of polarization of a light beam when it is reflected as at the surface of certain magnetized media.

Magneto optic recording media have several advantages over known magnetic recording media:
1. No contact between the medium and a recording head, thus eliminating a source of wear;
2. Using a pulsed laser beam as the writing means, very high density data storage is possible; and
3. With a protective layer on top of a magneto optic layer, the medium is affected less by dust than magnetic media.

In magneto optic recording, data is written into a medium having a preferentially directed remanent magnetization by exposing a localized area (spot or bit) on the recording medium to an electromagnetic or other energy source of sufficient intensity to heat the recording medium above its Curie or compensation point temperature and simultaneously biasing the medium with a magnetic field. Preferably, the energy source is a laser which produces a monochromatic output beam. The magnetic field required to reverse the magnetization of the recording medium varies with the temperature to which the recording medium is brought. Generally speaking for a given material, the higher the temperature, the smaller the required magnetic field coercive force.

The write or record operation for both Curie point and compensation point writing is as follows:
1. The medium is initially in a randomly magnetized state. A domain will herein refer to the smallest stable magnetizable region; although in common usage, a domain is a uniformly magnetized region of any size. A selected area of the medium may be magnetized by exposing it to a continuous energy beam and a small magnetic bias field normal to the surface of the medium.
2. A small magnetic bias field oriented perpendicular to the surface or plane of the medium, but oppositely directed to the magnetic field applied earlier is applied over the entire thin film medium.
3. With the biasing field in place, a light beam from a radiant energy source such as a laser beam is directed toward a selected location or bit on the medium where it causes localized heating of the medium to a temperature at or above the Curie and/or compensation temperature. When the laser beam is removed, the bit cools in the presence of the biasing magnetic field and has its magnetization switched to that direction. The medium, in effect, has a magnetic switching field which is temperature dependent. The magnetic biasing field applied to the irradiated bit selectively switches the bit magnetization, with the bit momentarily near its Curie and/or compensation temperature under the influence of the laser. The momentary temperature rise reduces the bit coercive force.

In the write operation, the write laser beam is focused to the desired diameter (e.g. 1.0 micrometer) onto the surface of the recording medium by an objective lens.

The memory element or recorded bit is interrogated, or read, nondestructively by passing a low-power (e.g. 1-3 mW) beam of polarized light (e.g. a laser beam) through the bit storage site for a sufficiently short time so as not to heat the medium to change its magnetic state. The read laser beam is normally shaped to a circular cross section by a prism, polarized and focused to the same diameter as the write beam onto the recording medium by a lens. When the read beam has passed through the recorded spot, it is sent through an optical analyzer, and then a detector such as a photodiode, for detection of any change or lack of change in the polarization.

A change in orientation of polarization of the light is caused by the magneto-optical properties of the material in the bit or site. Thus, the Kerr effect, Faraday effect, or a combination of these two, is used to effect the change in the plane of light polarization. The plane of polarization of the transmitted or reflected light beam is rotated through the characteristic rotation angle $\theta$. For upward bit magnetization, it rotates $\theta$ degrees and for downward magnetization $-\theta$ degrees. The recorded data, usually in digital form represented by logic values of 1 or 0 depending on the direction of bit magnetization, are detected by reading the change in the intensity of light passing through or reflected from the individual bits, the intensity being responsive to the quantity of light which is rotated and the rotation angle.

It was previously believed that the signal-to-noise ratio (SNR) or carrier-to-noise ratio (CNR) of an erasable magneto optic medium is proportional to $\theta \times R^{\frac{1}{2}}$ where $\theta$ is the angle of rotation and R is the reflectivity of the medium. Presently, the relationship between CNR and the parameters of a fully constructed magneto optic medium is not well understood. The process of optimizing media construction appears to be more complicated than simply optimizing $\theta \times R^{\frac{1}{2}}$.

Forty-five decibels in a 30 kHz band width is generally considered the minimum CNR acceptable for direct read after write (DRAW) media. The speed at which the bits can be interrogated and the reliability with which the data can be read depends upon the magnitude of the magneto optical properties, such as the angle of rotation, and upon the ability of the interrogation system to detect these properties. For purposes of this discussion, the noise floor or noise level is measured at the average noise level.

The main parameters that characterize a magneto optic material are the angle of rotation, the coercive force, the Curie temperature and the compensation point temperature. The medium is generally comprised of a single layer or multiple layer system where at least one of the layers is a thin film metal alloy composition. Binary and ternary compositions are particularly suitable for amorphous metal alloy formation. Suitable examples would be rare earth-transition metal (RE-TM) compositions, such as: gadolinium-cobalt (Gd—Co), gadolinium-iron (Gd—Fe), terbium-iron (Tb—Fe), dysprosium-iron (Dy—Fe), Gd—Tb—Fe, Tb—Dy—Fe, Tb—Fe—Co, terbium-iron-chromium (Tb—Fe—Cr), gadolinium-iron-bismuth (Gd—Fe—Bi), gadolinium-iron-tin (Gd—Fe—Sn), Gd—Fe—Co, Gd—Co—Bi, and Gd—Dy—Fe.

Many of the elements which are suitable for the rare earth-transition metal alloy layer react strongly with oxygen and other elements which may be present in the environment in which the media are used. Furthermore, the substrate upon which the alloy layer is deposited may itself contain impurities which react with the alloy layer. Thus, materials are deposited on one or both sides of the RE-TM thin film to protect it. To be effective, such materials must not themselves react with the rare earth-transition metal layer or any other layer, must offer chemical and physical resistance to degradation by heat, humidity, and corrosive chemicals, and must be transparent at the wavelengths used for reading and writing of data (typically about 8200 or 8300 angstroms for a laser diode, or approximately 6328 angstroms for a helium-neon laser, although other wavelengths may be used). A material is "transparent" for the purposes of this discussion when it absorbs less than about 20 percent of the intensity of an incident light beam at a particular wavelength.

Presently used dielectrics include silicon suboxide ($SiO_y$, $y<2$), titanium dioxide, silicon dioxide, cerium oxide, aluminum oxide, and aluminum nitride. Most of these materials contain oxygen, which can react with the rare earth element in the magnetizable layer and thereby degrade media performance. All these materials are dielectrics, i.e., they have very low electrical conductivity. This prevents the use of DC magnetron sputtering to deposit them on the other layers of a complete magneto optic medium. Instead, radio frequency (RF) sputtering, evaporation deposition, or reactive sputtering deposition, can be used.

DISCLOSURE OF INVENTION

The invention is a magneto-optic recording medium comprising a substrate, an amorphous magnetizable rare earth-transition metal alloy layer having a transparent dielectric layer on at least one side, and a reflective surface located to reflect light through the magnetizable alloy layer, wherein the dielectric layer is comprised of silicon carbide of the formula $SiC_x$, wherein x, the molar ratio of carbon to silicon, is greater than 1.

Many substrates can be used. They may be formed of any material which is nonmagnetic, dimensionally stable, minimizing radial displacement variations during recording and playback. Semiconductors, insulators, or metals can be used. Suitable substrates include glass, spinel, quartz, sapphire, aluminum oxide, metals such as aluminum and copper, and polymers such as polymethyl-methacrylate (PMMA) and polyester. Glass is preferred for applications requiring high dimensional stability, while polymers are preferred for mass production due to their comparatively lower cost.

The substrate is typically a disc. Common diameters include 3.5 inches (8.9 centimeters) and 5.25 inches (13.3 centimeters), although other sizes are used. Transparent substrates allow the construction of media in which the read and write light beams pass through the substrate before the recording layer, then onto a reflector layer, and back again to the recording layer after reflection. Such a medium is known as a substrate incident medium. When the reflector layer is between the substrate and the recording layer, the read and write beams will not be directed through the substrate. Such a medium is known as an air incident medium, although generally there is at least one layer between the recording medium and the air.

When a magnetizable amorphous material is deposited on a reflector, it is known that the magneto optic rotation is increased because the Faraday effect is added to the Kerr effect. The former effect rotates the plane of polarization of the light as it passes back and forth through the magneto optic layer while the Kerr effect rotates it at the surface of the layer. The reflective surface may be a smooth, highly polished surface of the substrate itself, or it may be the surface of a separate reflecting layer deposited by techniques known in the art such as vacuum vapor deposition. The reflective surface or layer usually has a reflectivity greater than about 50 percent (preferably 70 percent) at the recording wavelength. Deposited reflecting layers usually are about 500 to 5000 angstroms thick. Typical reflective surfaces or layers are copper, aluminum, or gold.

The recording medium thin film typically comprises an alloy of at least one rare earth element and at least one transition metal and usually is no more than 400 angstroms thick if a reflector is employed; if not, the film may need to be as thick as 2000 angstroms to produce the same magneto optic effects, as the Faraday effect will not be present. If it is too thin, generally 50 angstroms or less, the magneto optic film may not absorb enough light in the write mode. Sufficient coercivity to create a stable memory should be about 500 Oersteds (Oe), but a range of 2000 to 3000 Oe is generally used.

Oxidation of the magnetizable RE-TM layer is believed to be a major cause of loss of media performance.

A transparent layer can be deposited on one or both sides of the magnetizable amorphous film. When it is located between the reflecting layer and the magnetizable amorphous film, it is known as the intermediate layer. In this position, dielectric materials are preferred, as they are known to protect the alloy layer from reacting with the reflecting layer or any impurities in it. A dielectric layer also provides a thermal barrier, reducing heat conduction from the magnetizable amorphous film to the reflector layer, thereby reducing the laser power required to write data in the magnetizable amorphous film. The intermediate layer is generally 0 to 300 nanometers thick. Such an intermediate layer should have an index of refraction greater than about 1.2, preferably between 2.0 and 3.0. An intermediate layer with a high index of refraction allows the magneto optic rotation angle to be significantly increased by interference enhancement.

Interference enhancement may also occur when a second transparent layer is deposited on the other side of the magnetizable amorphous thin film. Such a layer will be called a barrier layer. Media having one interference layer (either an intermediate or barrier layer) plus the MO and reflective layers are referred to as trilayer media. Media having both an intermediate layer and a barrier layer are called quadrilayer media. When the barrier layer is constructed from a dielectric material, it also is characterized by an index of refraction greater than 1.2, although it need not be the exact same material as the intermediate layer. The index of refraction should not be so high, however, as to produce too much reflection from the interface of the barrier and substrate layers, if the barrier layer is located adjacent a transparent substrate on which the polarized light is first incident (substrate incident structure). The barrier layer is usually between about 30 and 200 nanometers thick.

In cases where the dielectric layer is in between the recording film and the reflecting layer or surface and there is no barrier layer (trilayer construction), it is beneficial to add a transparent passivating layer over the recording film layer. Passivation is the change of a chemically active metal surface to a much less reactive state. The transparent passivating layer is basically the same as the previously described transparent dielectric barrier layer but thinner, typically up to about 100 angstroms thick. As in the case of the transparent dielectric layer on the other side of the MO film, the passivating layer must protect the recording film from oxidation or corrosion due to excessive heat, humidity, or chemical reaction with impurities. It need not obtain the same optical effects (e.g., $\theta$ enhancement) as the thicker barrier layer. It is possible to combine the functions of the barrier layer and the passivating layer into a single layer comprised of a transparent dielectric material, and selecting the thickness to provide interference enhancement. Such a layer is still known as a barrier layer.

BRIEF DESCRIPTION OF THE DRAWING

FIG. No. 1 is an Auger spectrum of a silicon carbide layer of x=1.47 of this invention.

FIG. Nos. 2 and 3 are transmission electron microscope views at 200,000× of recording media of this invention, in cross section, showing the silicon carbide dielectric layers of this invention.

DETAILED DESCRIPTION OF THE INVENTION

Figure 1:
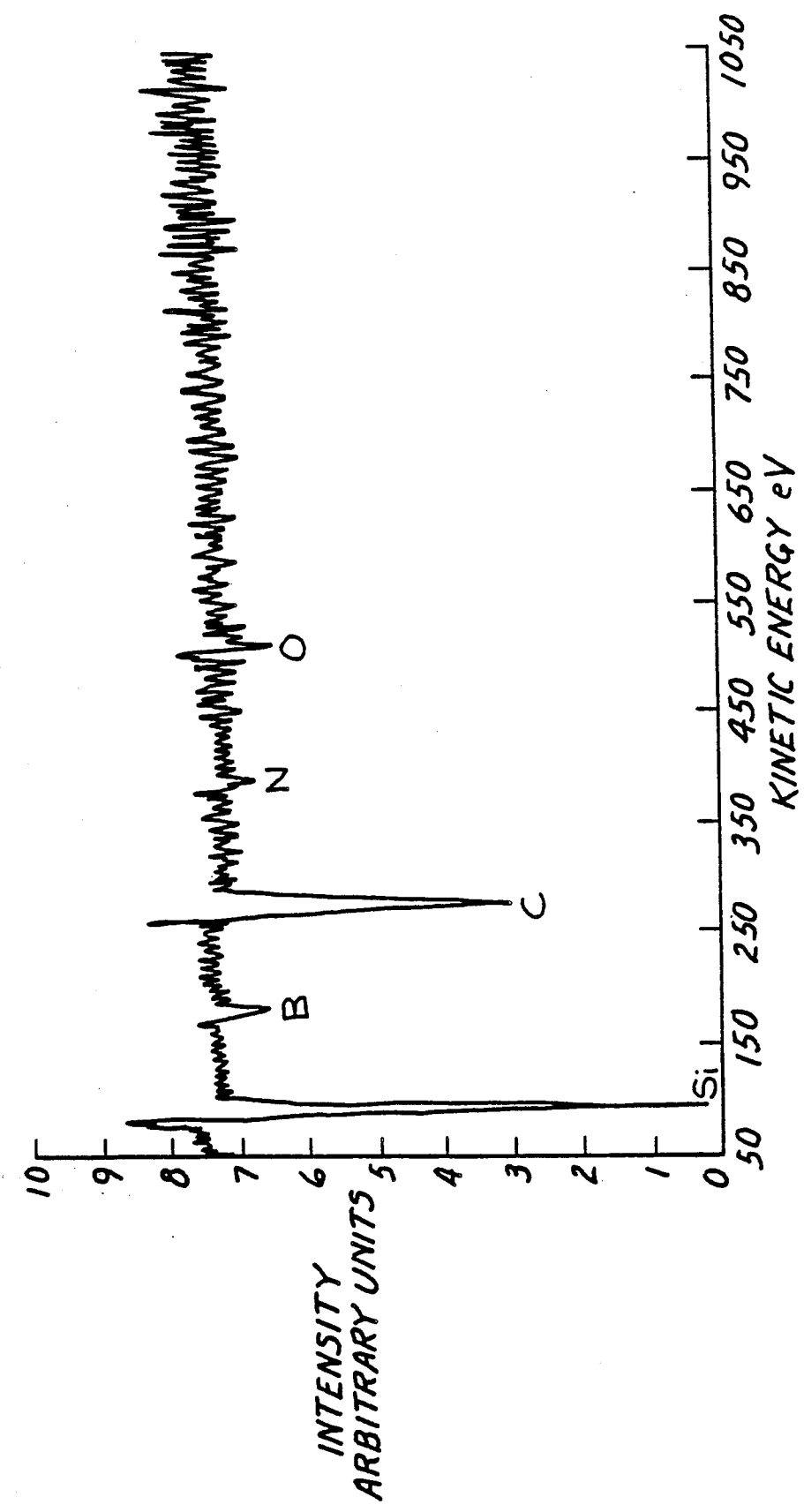

The magneto optic amorphous thin films can be made by known thin film deposition techniques, such as sputtering, evaporation and splat cooling. One preferred process is cathodic sputtering. Typical known sputtering conditions for amorphous thin films are: initial vacuum less than $1 \times 10^{-5}$ torr; sputtering pressure of from $3 \times 10^{-2}$ to $2 \times 10^{-2}$ torr; pre-sputtering of a sputtering source of material to clear the surface thereof; substrate temperature of 30 degrees to 100 degrees C.; and a noble gas (usually argon) partial pressure.

In the cathodic sputtering process, gas ions bombard the solid alloy target cathode in the sputtering chamber, dislodging metal atoms by transferring the momentum of the accelerated ions to the metal atoms near the surface of the target. The substrate is placed at the anode, and the metal alloy atoms traverse the space between the anode and cathode to deposit on the substrate.

In the triode sputtering process, a thermionic cathode, known as an emitter, is added to the sputtering chamber between the anode and cathode. This allows the gas plasma to be maintained at much lower pressures than a direct current glow discharge, even in a magnetic field or magnetron. Typically an argon plasma can be maintained at $4 \times 10^{-3}$ to $6 \times 10^{-4}$ torr gauge pressure. This process enables the sputtered atoms to strike the substrate at a higher energy than they would at a higher pressure since there are fewer argon ions in the space between the target and substrate to interfere with the motion of the sputtered atoms, increasing the mean-free-path.

Magnetically enhanced sputtering, in which a magnetic field is applied in the sputtering chamber perpendicularly to the electric field, further reduces the pressures needed to sputter and thereby increases the mean-free-path. This is because the magnetic field deflects electrons into following spiral-like paths with greater distances to travel to reach the anode. The longer path increases the probability of collision with the gas atoms. These collisions produce the gas ions which dislodge the sputter target atoms, hence an increase in probability of gas collision increases the sputtering rate. Another feature of magnetic enhancement is that electrons are confined to the ionized gas plasma and produce less heating of the substrate by electron bombardment. This feature is a benefit when it is desired to use substrates with comparatively low melting points.

Currently used dielectric materials are deposited by several methods which have disadvantages. Evaporation deposition requires much lower vacuum pressures than the sputtering techniques used to deposit the RE-TM alloy films; uniform film deposition over a wide area is difficult; and the deposition rate is difficult to control because it is an exponential function of evaporation boat temperature. Radio frequency (RF) sputtering produces excessive heat at the substrate, making some inexpensive plastic substrates unusable; and the RF signals can interfere with computer controlled manufacturing processes.

Reactive sputter deposition requires the addition of a reactive gas to the chamber, which can contaminate the other deposition processes; and the gas may react at the sputter target surface, forming a nonconductive film which interferes with the sputtering.

Direct current (DC) magnetron sputtering offers superior deposition rate control and deposited film thickness when compared to evaporation techniques. Nonreactive DC magnetron sputtering (i.e., no reactive gases present) reduces the contamination of other processes carried out in the same deposition chamber. Temperatures generated at the substrate are low enough to permit the use of plastic substrates. There is less electromagnetic interference with control equipment than is produced by the RF methods. Therefore, the DC magnetron sputtering process is preferred for depositing the dielectric layers (either the intermediate or barrier layers, or both).

DC magnetron sputtering requires a sputtering target which is electrically conductive. Assuming a target current of 50 mA/cm$^2$ and that an induced through-target voltage drop greater than 50 volts is unacceptable, a maximum target material resistance of 1000 ohm/cm$^2$ is required. For a target thickness of 0.3 cm, the permissible resistivity is approximately 3300 ohm-cm or less.

A suitable material for nonreactive DC magnetron sputtering is electrically conductive silicon carbide, available from the Standard Oil Company, Structural Ceramics Division, under the trademark Hexoloy. A grade of the material, identified by this manufacturer as SG, is produced by blending approximately 95 percent SiC and 5 percent graphite powder by weight and adding suitable binders. The blended powders are extruded to form a sheet or rod, and then sintered in high temperature graphite furnaces. The final product consists of SiC grains in a matrix of electrically conductive porous graphite. The electrical conductivity at 20 degrees C. is between 0.2 and 300 ohm-cm, depending upon the dopants used.

Electrically conductive silicon carbide can be used as a DC sputtering target without bonding to a backing plate. The outer portion of the material has higher carbon content, which has been found to produce sputtered films with carbon/silicon ratio strongly determined by sputtering time. A pre-sputtering procedure to clean the target is used to improve the uniformity of the films produced.

The thin films produced with a silicon carbide and graphite sputter target have the chemical formula $SiC_x$, wherein x, the molar ratio of carbon to silicon, is greater than 1. The carbon-rich silicon carbide films also have detectable concentrations of other elements, which are believed to be due to the binders used in a particular blend of powders. Generally speaking, the more electrically conductive the SiC/graphite sputtering target is, the higher the value of x in the deposited film. Excessively conductive blends produce films with large x values (e.g., 3.0 or more), but they lose transparency and thus are less acceptable for magneto optic media applications.

FIG. 1 is a Auger Electron Spectroscopy (AES) spectrum of a transparent dielectric layer deposited on a substrate from a pre-sputtered target. The target material was Hexoloy SG SiC/graphite. The sputter targets used were 0.25 inch (6.4 centimeter) thick by 12 inches (30.5 centimeters) long by 5 inches (12.7 centimeters) wide. The spectrum indicates the presence of carbon, boron, silicon, nitrogen, and oxygen in detectable concentrations. Using the peak intensities and standard sensitivity factors known in the art, the atomic concentration of the dielectric was estimated as Si(35%)C(51%)B(7%)N(5%)O(2%), which yields a value of $x=(.51/.35)=1.47$. The binders are the suspected source of boron and nitrogen, while the oxygen is believed to come from contamination of the vacuum chamber during sputtering. Because oxygen may react strongly with one or more elements in the amorphous rare earth-transition metal alloy layer, terbium for example, the oxygen concentration should be minimized.

It is also desirable to perform the DC magnetron sputtering at low noble gas partial pressures, typically 0.01 torr or less. The resulting media show less decrease in coercivity with time (a measure of media storage stability) than media produced by sputtering at higher pressures.

The magneto optic recording media produced in the reduction of this invention to practice were substrate incident, quadrilayer media. The substrates were glass or polycarbonate. The amorphous rare earth-transition metal (RE-TM) alloy used for the recording layer comprised approximately 69 atomic percent iron, 23 atomic percent terbium, and 8 atomic percent cobalt. The RE-TM layer was deposited by magnetically enhanced triode sputtering. The reflector layer comprised an aluminum-2% chromium alloy, and was deposited by nonreactive DC magnetron sputtering. Both transparent dielectric layers were deposited by DC nonreactive magnetron sputtering. All layers were sputtered at $1\times 10^3$ torr gauge pressure of ultra pure (99.999 percent minimum purity) argon.

The relative thicknesses of the magnetizable amorphous magneto optic film and the transparent dielectric intermediate layer in the trilayer construction, and the intermediate dielectric and barrier dielectric layers and magnetizable amorphous film of the quadrilayer construction, are selected to yield a magneto optic angle of rotation exceeding that of the medium without the added layers.

The effect of the thickness of the intermediate layer on media characteristics was studied. Glass substrates were sputtered with 200 angstrom thick barrier layers, 230 angstrom thick RE-TM layers, varying thickness intermediate layers (in the range of 250 to 450 angstroms), and 1500 angstrom thick reflector layers. Both the barrier and intermediate layers were comprised of a $SiC_x$ (x>1) transparent dielectric. Reflectivity was essentially linear with dielectric layer thickness, ranging from approximately 16 percent at 250 angstroms to 20 percent at 450 angstroms. Carrier-to-noise ratio (1.4 micron bit size, 30 kHz bandwidth) peaked at nearly 53 db at 300 angstroms. The rotation angle, $\theta$, decreased essentially linearly from approximately 0.65 degrees at 250 angstroms thickness to approximately 0.20 degrees at 450 angstroms thickness.

The effect of the thickness of the barrier layer on media characteristics was also studied. Glass substrates were sputtered with varying thickness barrier layers (in the range of 290 to 430 angstroms), 250 angstrom thick RE-TM layers, 360 angstrom thick intermediate layers, and 800 angstrom thick reflector layers. Both the barrier and intermediate layers were comprised of a $SiC_x$ (x>1) transparent dielectric. Reflectivity decreased rapidly with increased barrier layer thickness, ranging from approximately 28 percent at 290 angstroms to 18 percent at 430 angstroms. Carrier-to-noise ratio (1.4 micron bit size, 30kHz bandwidth) generally increased with increasing thickness, peaking at approximate 53 db at 430 angstroms. The rotation angle, $\theta$, increased essentially linearly from approximately 0.60 degrees at 290 angstroms thickness to approximately 0.85 degrees at 430 angstroms thickness.

The carrier-to-noise ratio (CNR) of media made in accordance with this invention is relatively large, examples having been measured at approximately 50 db when measured with a laser diode at a wavelength of about 8300 angstroms. For representative embodiments of the invention, the threshold power for a laser diode in a write mode has been found to be approximately 4 mW, which is acceptable because it is greater than the desired read laser power, typically 1-3 mW. Bit Error Rate (BER), a measure of the amount of digital data lost due to degradation of the RE-TM layer with time, for certain of the inventive media is on the order of $10^{-5}$.

EXAMPLE 1

To compare the invention to media prepared with the silicon suboxide common in the art, two series of quadrilayer media were prepared. The substrates were identical and were made of injection molded polycarbonate. The silicon carbide dielectric layers were DC sputtered as described above, and the silicon suboxide layers were thermally evaporated using techniques known in the art. Eight media were constructed with silicon suboxide ($SiO_y$, y<2) dielectric layers, and fifteen media with the silicon carbide layers of this invention. The following table compares the average results of the two series. Data were taken on tracks near the inside diameter of the media. Carrier-to-noise ratio (CNR) (1.4 micron bit size, 30 kHz bandwidth) data were taken with an 8300 angstrom laser diode at three different write power levels, as shown. Bit error rate (BER) measurements were made after 800 hours exposure to 80 degrees C. and 90 percent relative humidity.

TABLE 1

| Dielectric Material | Write Threshold (mW) | CNR (db) | | | Background Noise (db) | BER |
|---|---|---|---|---|---|---|
| | | 6 mW | 7 mw | 8 mW | | |
| $SiO_y$ | 3.8 | 50 | 51 | 51 | −62 | $4 \times 10^{-5}$ |
| $SiC_x$ | 3.2 | 48 | 50 | 50 | −61 | $4 \times 10^{-5}$ |

EXAMPLE 2

The resistance to thermal degradation over time of quadrilayer media with polycarbonate substrates and the carbon-rich silicon carbide dielectrics was also compared to that of media prepared with silicon suboxide layers. For example, the carrier-to-noise level of run 422, made with $SiC_x$, was approximately 95 percent of initial value after exposure to an elevated temperature of 100 degrees C. for 1300 hours between measurements (CNR was measured at room temperature). A similar comparison for run 217, made with $SiO_y$, showed a normalized CNR of approximately 95 percent of initial value after 220 hours exposure to 115 degrees C.

EXAMPLE 3

Another measure of media stability is the change in coercivity of the RE-TM layer with time. Three samples, identified as runs 587, 595, and 585, were constructed. They were trilayer construction comprising a glass slide substrate, a 200 angstrom $SiC_x$ dielectric barrier layer, a 500 angstrom FeTbCo RE-TM layer, and a 200 angstrom $SiC_x$ dielectric intermediate layer. The dielectric layers of different runs were sputtered at different argon partial pressures to test the effect of this parameter on media stability. Each dielectric layer of a given run was sputtered at the same pressure. The media were exposed to 115 degrees C. to accelerate their aging. Measurements of the coercivity of the RE-TM layer were made at room temperature after various times, as shown below.

TABLE 2

| Run | Sputter Pressure (torr) | Normalized Coercivity With Time (Hours) (1.0 at 0 hours) | | | |
|---|---|---|---|---|---|
| | | 16 | 44 | 134 | 164 |
| 587 | $1 \times 10^{-2}$ | .48 | .39 | .27 | — |
| 595 | $5 \times 10^{-3}$ | .55 | — | — | .45 |
| 585 | $8 \times 10^{-4}$ | .73 | .70 | .70 | — |

Other samples from runs 587 and 585 were aged at 80 degrees C. and 90 percent relative humidity for 230 hours. After the exposure, the media were inspected with a magneto optical looper, a device for measuring rotation angle as a function of applied magnetic field. The run 585 medium exhibited the ability to magnetize a bit perpendicular to the plane of the RE-TM layer, and in the direction opposite that of the RE-TM layer adjacent to it. The run 587 medium did not exhibit this ability.

Figure 2:
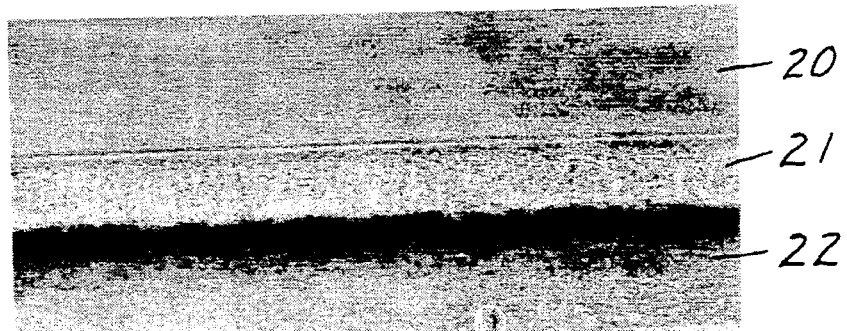
Figure 3:
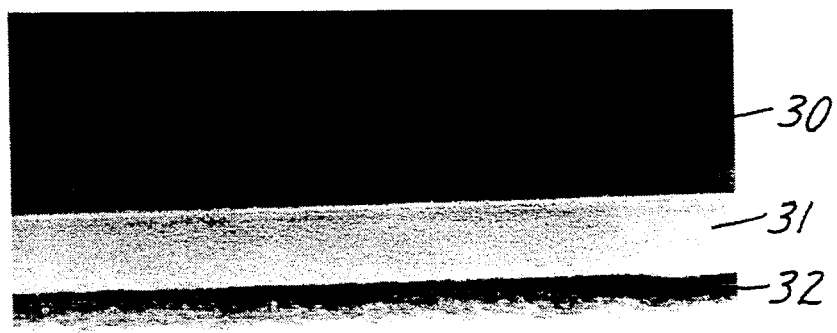

FIGS. 2 and 3 are transmission electron microscope (TEM) views of samples from runs 587 and 585, respectively, enlarged by factor of 200,000. Layers 20 and 30 are the glass substrates, layers 21 and 31 are the 200 angstrom $SiC_x$ dielectric barrier layers, and layers 22 and 32 are the RE-TM layers. The TEM sample preparation process removed the 200 angstrom dielectric intermediate layer of each sample, as well as much of the RE-TM layer 22 of the run 587 sample, leaving empty space at the lower portion of each figure. Inspection of the figures shows a more uniform and dense structure in the dielectric layer 31 of run 585 than is visible in the dielectric layer 21 of run 587. This experiment established that sputtering of the dielectric layer should be accomplished at as low an argon partial pressure as possible, preferably below $5 \times 10^{-3}$ torr.

EXAMPLE 4

To establish the effect of the carbon/silicon ratio, x, on the optical properties of the $SiC_x$, a series of runs was made in which a $SiC_x$ layer was deposited at $8 \times 10^{-4}$ torr onto glass slides. The carbon or silicon content of the films was adjusted by adding carbon or silicon, respectively, to the Hexoloy SG silicon carbide/graphite material described above. The x value was measured by Auger Electron Spectroscopy. Optical properties of the dielectric layers were measured using a substrate incident 8300 angstrom laser. The results are presented in Table 3.

TABLE 3

| Run | R | T | A | t | n | k | x |
|---|---|---|---|---|---|---|---|
| 521 | .42 | .50 | .04 | 474 | 3.0 | .09 | 1.21 |
| 506 | .38 | .53 | .05 | 530 | 2.8 | .09 | 1.57 |
| 524 | .34 | .58 | .04 | 480 | 2.7 | .08 | 1.67 |
| 626 | .34 | .49 | .17 | 488 | 2.8 | .20 | 2.10 |
| 625 | .28 | .51 | .21 | 456 | 2.7 | .30 | 2.39 |

R is the reflection coefficient
T is the transmission coefficient
A is the absorption coefficient
(Note that R + T + A ≠ 1.0 due to measurement and rounding errors)
t is the thickness in angstroms
n is the index of refraction
k is the extinction coefficient
(Note that n and k were calculated from R, T, A, and t using known relationships)
x is the carbon/silicon ratio As stated earlier, it is desirable to maintain the absorption of the dielectric layer below about 20 percent to ensure that the layer is sufficiently transparent for use in a magneto optic medium. It is also desireable to maintain the index of refraction between about 2.0 and 3.0, particularly in the case of an intermediate layer. This experiment established a preferred carbon/silicon ratio below approximately 2.4, more preferably between about 1.2 and about 2.0.

Although the media of this invention are erasable, they may be used in the same applications as write-once or non-erasable media. A two-sided medium is also possible by combining two one-sided media through means known in the art. One may also groove the magneto optic recording media to aid in locating recording tracks.

While certain representative embodiments and details have been shown to illustrate this invention, it will be apparent to those skilled in this art that various changes and modifications may be made in this invention without departing from its true spirit or scope, which is indicated by the following claims.

I claim:

1. A method of making a magneto-optic recording medium comprising a substrate, an amorphous magnetizable rare earth-transition metal alloy layer, a transparent dielectric layer on at least one side of the rare earth-transition metal alloy layer, which method comprises the steps of:
   (A) providing the substrate,
   (B) depositing the amorphous magnetizable rare-earth-transition metal alloy layer such that it is effective in producing the magneto optic effect;
   (C) providing an electrically conductive sputtering target comprising silicon and carbon; and
   (D) depositing, from the target provided, by DC magnetron sputtering, a dielectric layer comprising silicon carbide of the formula $SiC_x$, wherein x is greater than 1.

2. The method of claim 1 wherein the rare earth-transition metal alloy layer comprises iron, terbium, and cobalt.

3. The method of claim 1 wherein x is greater than or equal to 1.2.

4. The method of claim 1 wherein the DC magnetron sputtering is performed at a noble gas partial pressure less than 0.01 torr.

5. The method of claim 1 wherein the electrically conductive sputtering target comprises silicon carbide and graphite.

6. The method of claim 1 wherein the magneto-optic recording medium further comprises a reflective surface located to reflect light through the magnetizable rare earth transition metal alloy layer, and further comprising the step of:
   (E) producing the reflective surface such that it is effective in reflecting polarized light transmitted through the rare earth-transition metal alloy layer.

7. The method of claim 6 wherein step (E) comprises depositing a reflective layer.

* * * * *